United States Patent
Howard et al.

(10) Patent No.: US 7,554,527 B2
(45) Date of Patent: Jun. 30, 2009

(54) SENSING APPARATUS AND METHOD

(75) Inventors: Mark Anthony Howard, Worlington (GB); Colin Stuart Sills, Cambridge (GB); Victoria Ann Clark, Cambridge (GB)

(73) Assignee: Sensopad Limited (GB)

( * ) Notice: Subject to any disclaimer, the term of this patent is extended or adjusted under 35 U.S.C. 154(b) by 177 days.

(21) Appl. No.: 10/503,362

(22) PCT Filed: Feb. 5, 2003

(86) PCT No.: PCT/GB03/00495

§ 371 (c)(1),
(2), (4) Date: Jun. 23, 2005

(87) PCT Pub. No.: WO03/067181

PCT Pub. Date: Aug. 14, 2003

(65) Prior Publication Data

US 2006/0044275 A1    Mar. 2, 2006

(30) Foreign Application Priority Data

Feb. 5, 2002  (GB) ................................ 0202648.2
Dec. 9, 2002  (GB) ................................ 0208672.2

(51) Int. Cl.
*G09G 5/08* (2006.01)
(52) U.S. Cl. .................. 345/164; 342/147; 345/167
(58) Field of Classification Search ............ 310/10; 345/163–174; 342/147
See application file for complete search history.

(56) References Cited

U.S. PATENT DOCUMENTS

| | | | |
|---|---|---|---|
| 3,331,972 A * | 7/1967 | Moller | .................. 310/10 |
| 4,855,704 A | 8/1989 | Betz | |
| 5,583,541 A * | 12/1996 | Solhjell | .................. 345/163 |
| 5,815,091 A | 9/1998 | Dames et al. | |
| 5,831,553 A | 11/1998 | Lenssen et al. | |
| 5,920,307 A * | 7/1999 | Blonder et al. | .................. 345/167 |
| 5,969,520 A | 10/1999 | Schottler | |
| 6,144,370 A | 11/2000 | Eleyan et al. | |
| 2002/0003527 A1 | 1/2002 | Baker et al. | |

FOREIGN PATENT DOCUMENTS

| | | |
|---|---|---|
| DE | 1 261 581 | 2/1968 |
| DE | 197 33 231 | 2/1999 |
| EP | 0 417 921 | 3/1991 |
| EP | 0 775 967 | 11/1996 |

(Continued)

*Primary Examiner*—Chanh Nguyen
*Assistant Examiner*—Calvin C Ma
(74) *Attorney, Agent, or Firm*—Fogg & Powers LLC

(57) ABSTRACT

There is described an apparatus which monitors the orientation of or the rotational movement of a substantially spherical body. The apparatus comprises a substantially spherical body with at least one resonant circuit fixed thereto. A transmit aerial generates an alternating magnetic field in the region of space including the spherical body which induces an electric signal in the or each resonant circuit, and a receive aerial receives an induced sense signal generated in response to said induced electric signal in the or each resonant circuit. The electromagnetic coupling between the transmit aerial and the receive aerial via the or each resonant circuit varies in accordance with the orientation of the spherical body so that the induced sense signal in the receive aerial varies in accordance with the orientation of the spherical body.

25 Claims, 7 Drawing Sheets

FOREIGN PATENT DOCUMENTS

| | | |
|---|---|---|
| EP | 0989510 | 3/2000 |
| JP | 05340709 | 12/1993 |
| WO | WO 98/36346 | 8/1998 |
| WO | 0143063 | 6/2001 |
| WO | WO 01/42865 | 6/2001 |

* cited by examiner

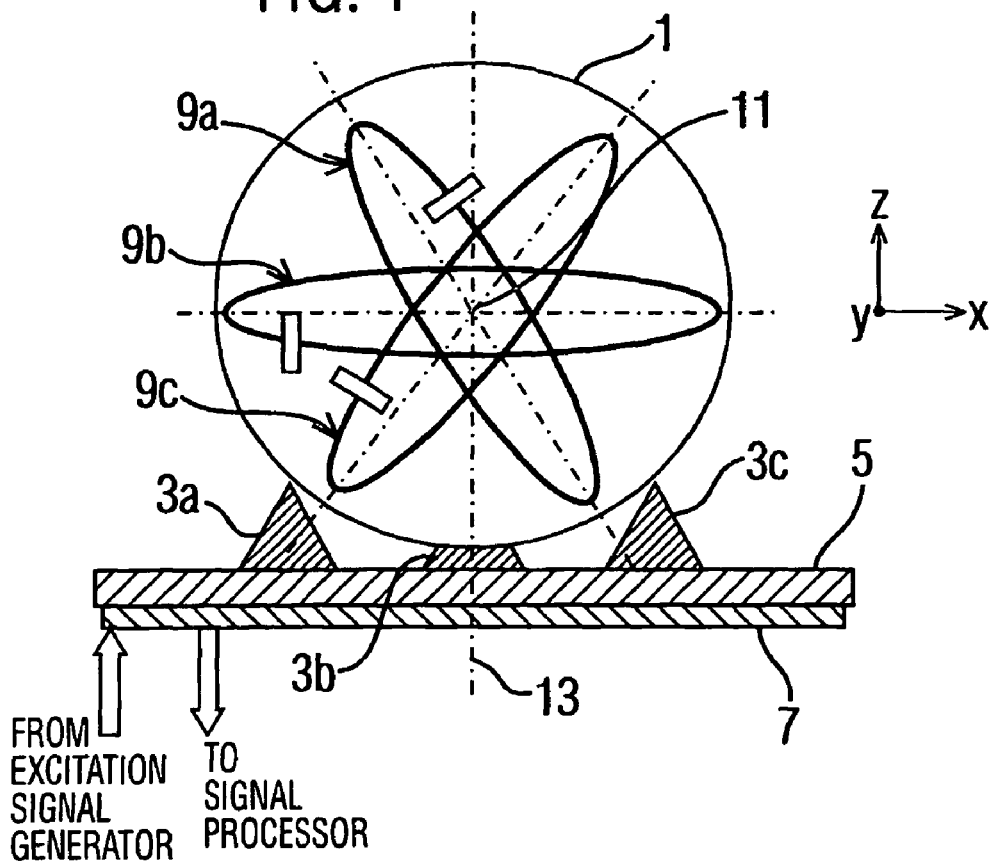
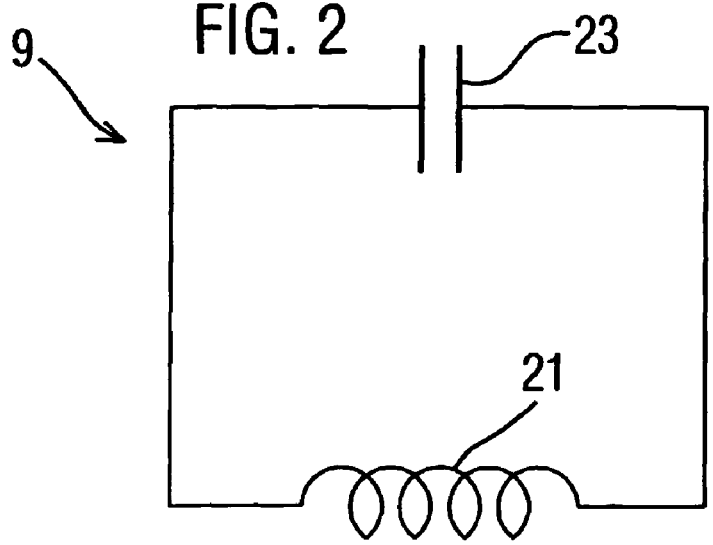

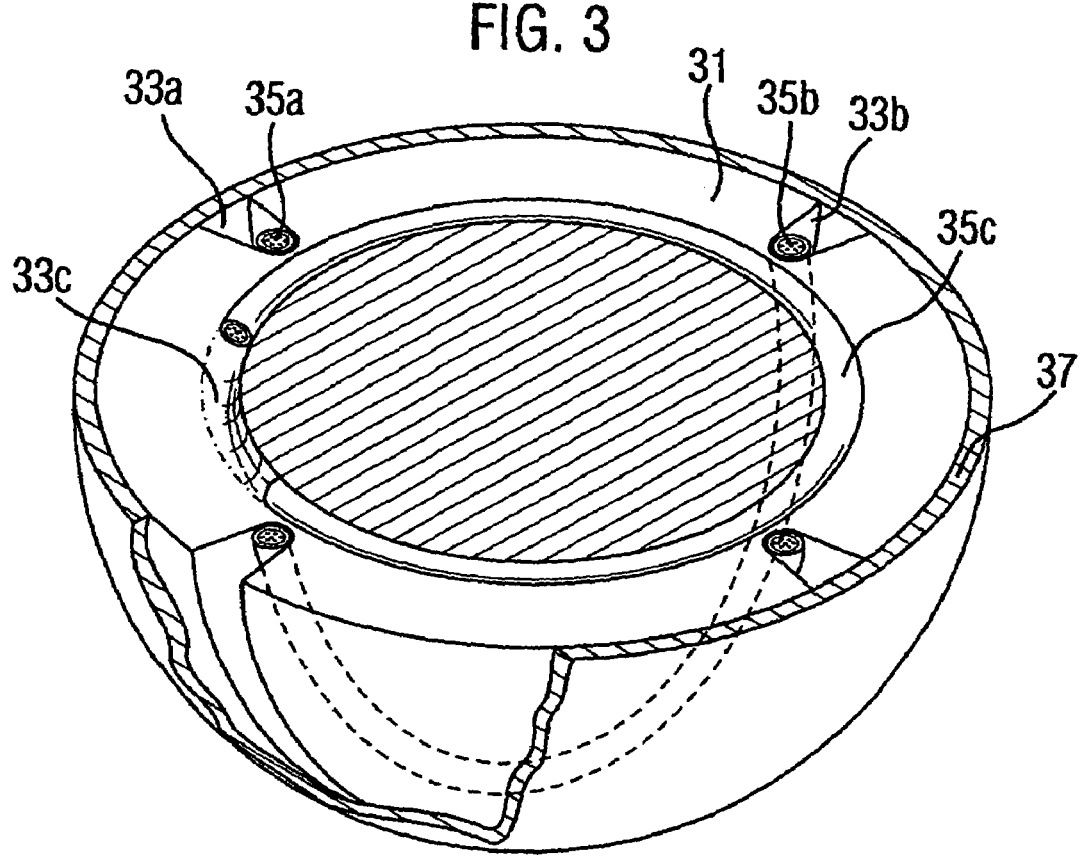

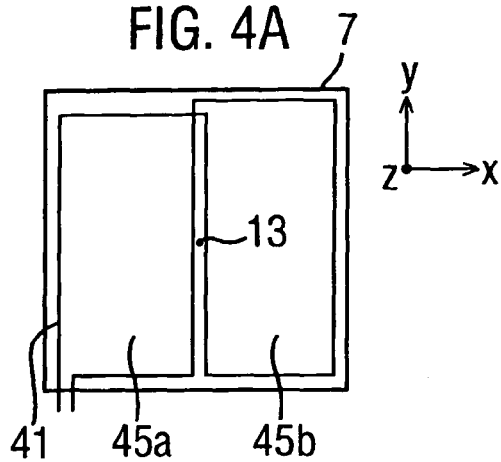
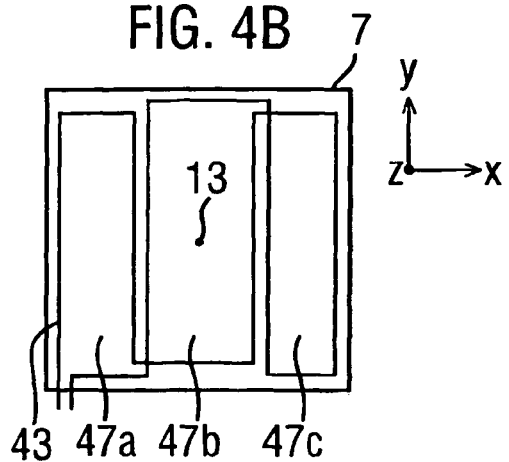
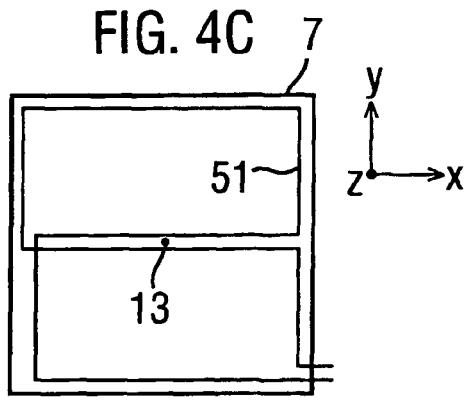
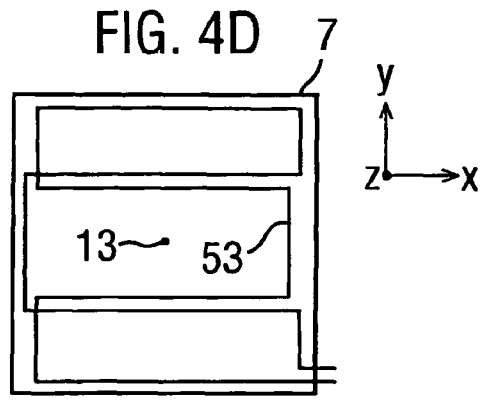
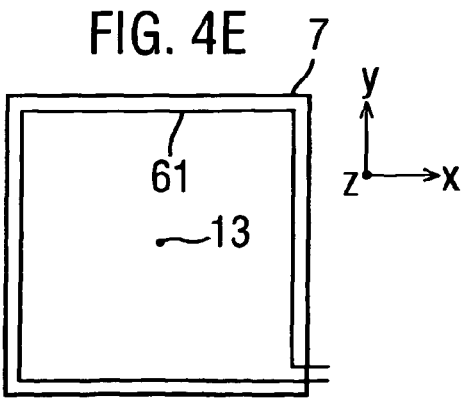

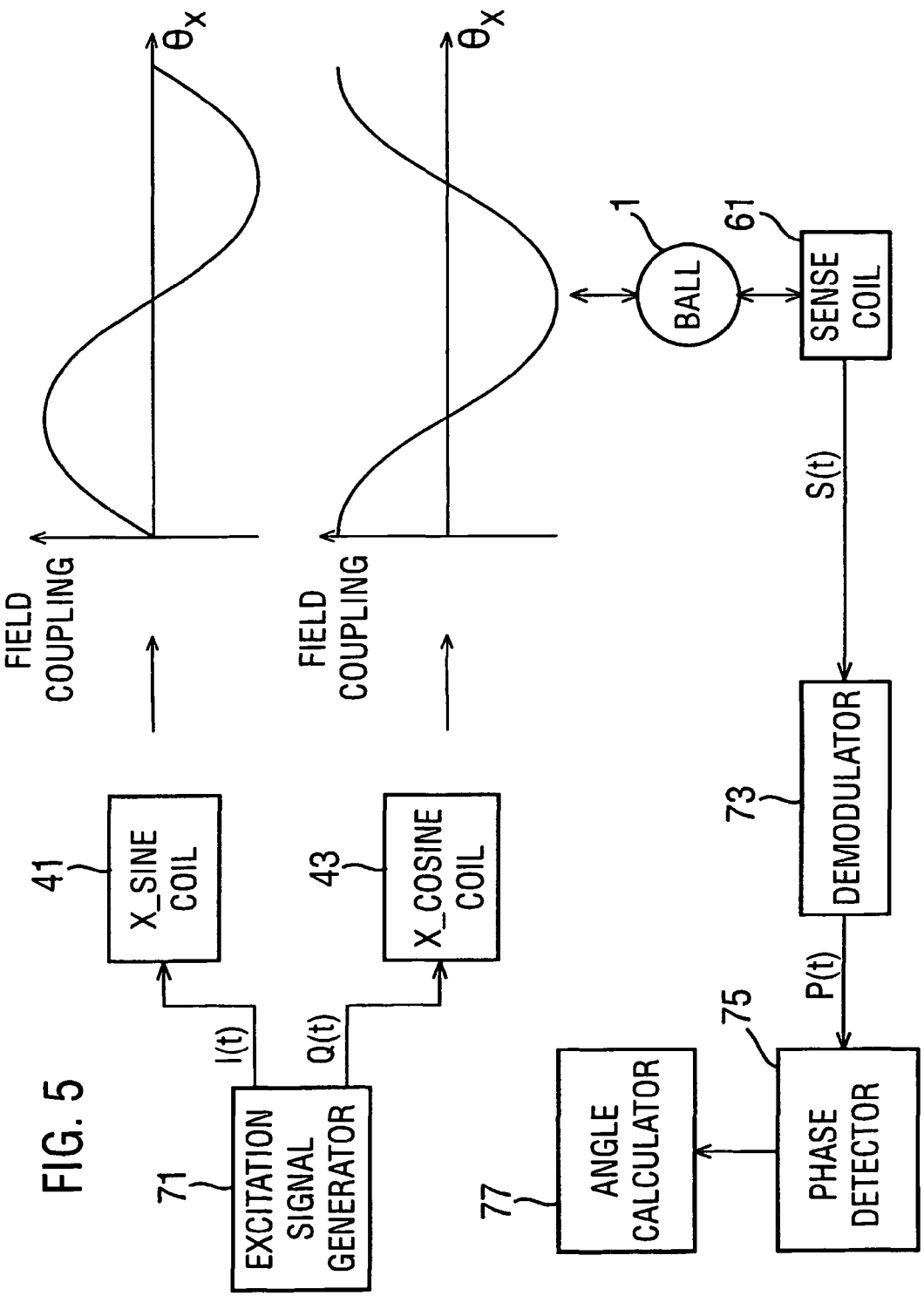

1

SENSING APPARATUS AND METHOD

This application claims priority to International Patent Application No. PCT/GB03/00495 filed on Feb. 5, 2003, which claims priority to GB Patent Application No. 0202648.2 filed on Feb. 5, 2002 and GB Patent Application No. 0208672.2 filed on Dec. 9, 2002.

This invention relates to an apparatus for monitoring at least one of the rotational movement and the orientation of a substantially spherical body. The invention has particular, but not exclusive, relevance to a man-machine interface in which a user inputs information to a machine by varying the orientation of a substantially spherical body.

One example of such a man-machine interface is a ball tracking device in which a user directly moves a ball and one or both of the direction and the speed of rotation of the ball conveys information to the associated machine. Another example of such a man-machine interface is a computer mouse in which a ball is mounted in a housing with part of the ball protruding through the housing to contact a surface on which the computer mouse rests. A user holds the housing and drags the mouse across the surface causing the ball to rotate, and one or both of the direction and the speed of rotation conveys information to the associated machine. A further example of such a man-machine interface is a joystick in which a ball-and-socket joint is formed at one end of a lever, and the user moves the lever to cause rotation of the ball in the ball-and-socket joint, one or both of the direction and the speed of rotation conveying information to the associated machine.

A common mechanism for monitoring the orientation of a spherical body utilises a pair of orthogonally arranged shafts which contact the spherical body so that they rotate as the spherical body rotates. The rotation of each shaft is measured using a respective optical sensor in which a beam of light is broken by paddles attached to each of the shafts. The resulting light pulses are electronically registered and processed to provide orientation information to the host machine. However, ingress of foreign matter such as dirt can interfere with the friction characteristics between the spherical body and rotating shafts, and can also obscure the light beams used by the optical sensors.

According to the present invention, there is provided a sensor in which an inductive sensing arrangement is used to monitor the orientation of, or rotational movement of, one or more resonant circuits mounted in or on a spherical body. By using such an arrangement, the number of moving parts may be reduced, thereby improving reliability.

In a preferred embodiment, the inductive sensor comprises a transmit aerial and a receive aerial which are isolated from the external environment by a membrane to prevent the ingress of foreign matter to the cavity housing the electronics associated with the man-machine interface. Preferably, the membrane is impermeable.

Exemplary embodiments of the present invention will now be described with reference to the accompanying drawings in which:

FIG. 1 schematically shows a side view of a ball tracking device;

FIG. 2 is a circuit diagram of a resonant circuit which forms part of the ball tracking device illustrated in FIG. 1;

FIG. 3 is a sectional view through the centre of a ball forming part of the ball tracking device illustrated in FIG. 1;

FIGS. 4A to 4E are schematic plan views of windings deposited on a printed circuit board which forms part of the ball tracking device illustrated in FIGURE 1;

Figure 6:
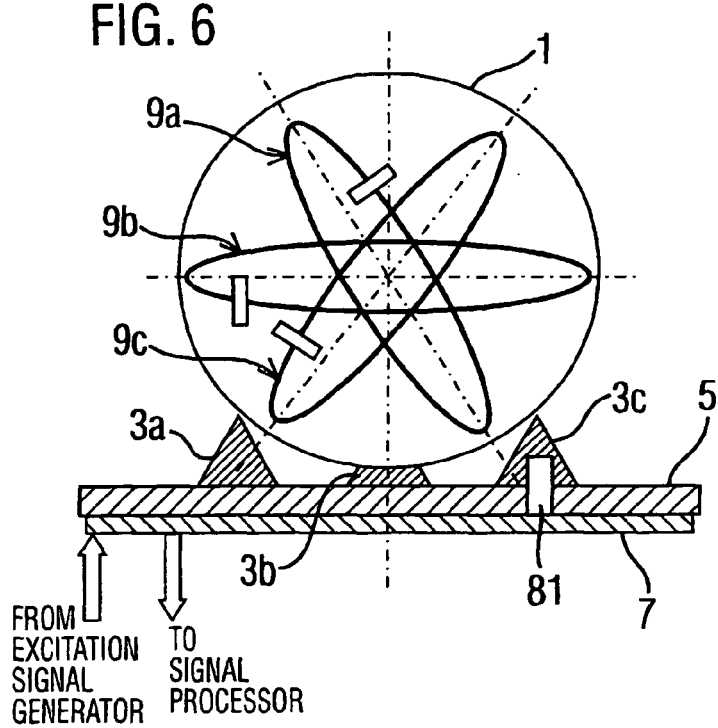
Figure 7:
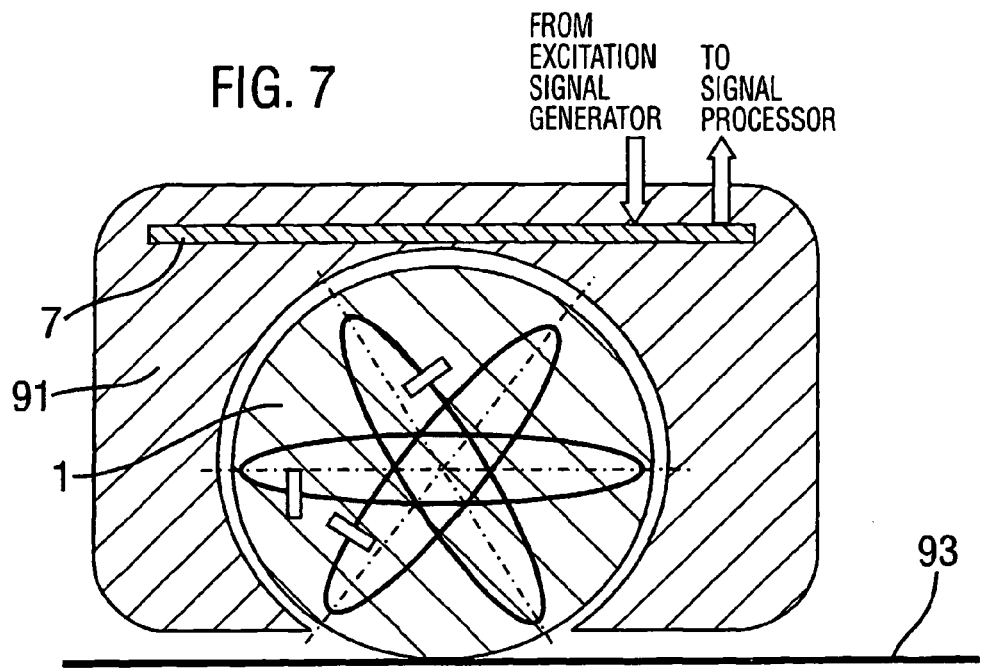
Figure 8:
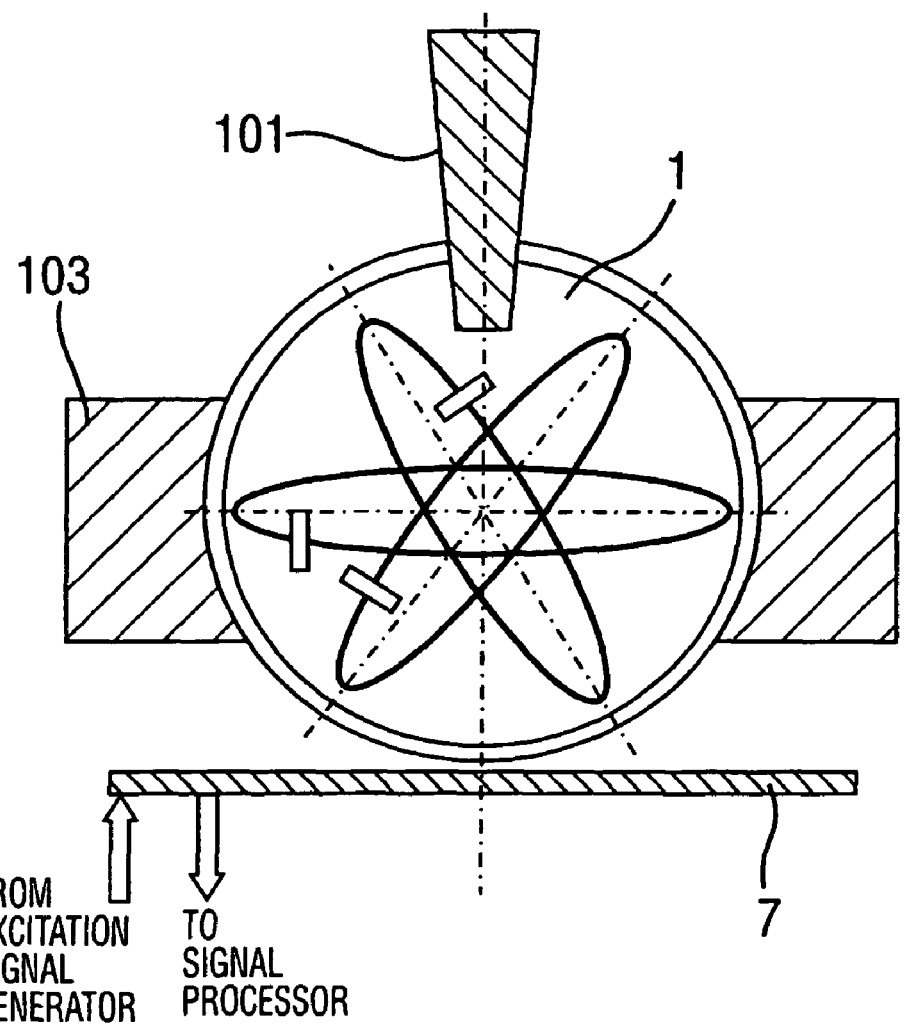
Figure 9:
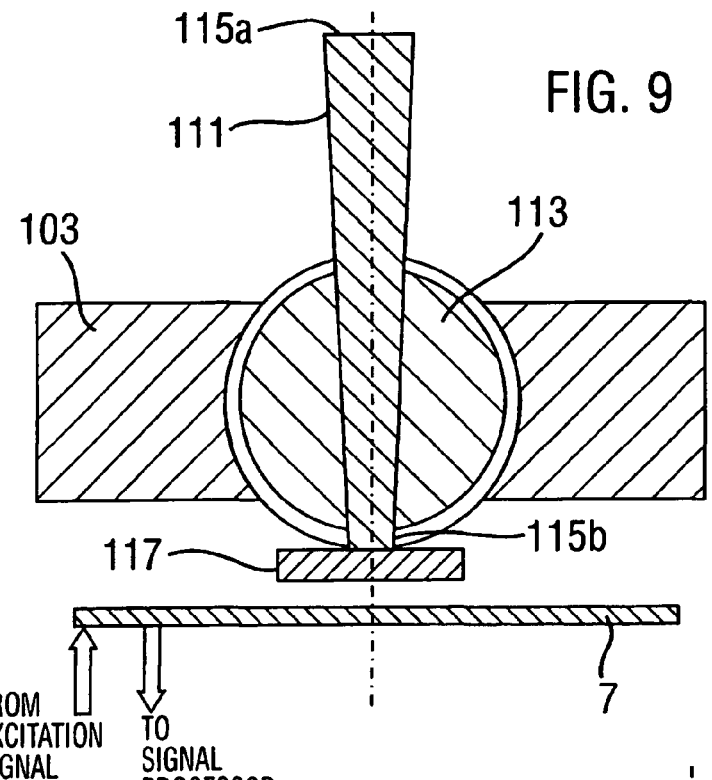
Figure 10:
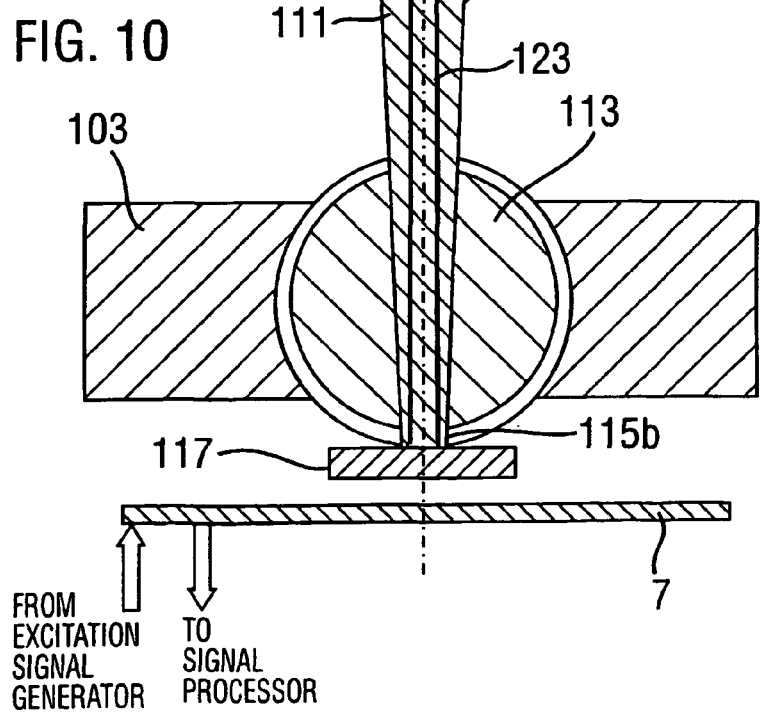

FIG. 5 schematically shows electronic circuitry associated with the ball tracking device illustrated in FIG. 1;

FIG. 6 schematically shows a side view of an alternative ball tracking device to the ball tracking device illustrated in FIG. 1;

FIG. 7 schematically shows a side view of a computer mouse;

FIG. 8 schematically shows a side view of a joystick;

FIG. 9 schematically shows a side view of an alternative joystick to the joystick illustrated in FIG. 8; and FIG. 10 schematically shows a side view of a second alternative joystick to the joystick illustrated in FIG. 8.

FIRST EMBODIMENT

A ball tracking device which forms a first embodiment of the invention will now be described with reference to FIGS. 1 to 5.

As shown in FIG. 1, the ball tracking device includes a ball 1 which rests on three point supports 3a, 3b, 3c which protrude from a planar impermeable membrane 5. In this embodiment, the planar membrane 5 is positioned in the X-Y plane. The point supports 3 prevent lateral movement of the ball 1 relative to the membrane 5, but allow the ball 1 to rotate in all directions under the influence of a user.

The ball 1 includes three resonant circuits 9a, 9b and 9c which are generally arranged in mutually orthogonal planes which intersect at the centre 11 of the ball 1.

The membrane 5 separates the ball 1 from a printed circuit board (PCB) 7 on which are formed a transmit aerial and a receive aerial (not shown in FIG. 1). The point supports 3 maintain the centre 11 of the ball 1 above a fixed point 13 on the PCB 7.

The transmit aerial is connected to an excitation signal generator (not shown in FIG. 1) which supplies electrical signals to the transmit aerial to generate a magnetic field. In response to an electrical signal being applied to the transmit aerial, the generated magnetic field induces resonant signals in one or more of the resonant circuits 9 which vary in accordance with the orientation of the ball 1, and these resonant signals in turn induce a sensed signal in the receive aerial on the PCB 7. The receive aerial is connected to a signal processor (not shown in FIG. 1) which processes the sensed signal from the receive aerial to determine the orientation of the ball 1.

It will be appreciated that the impermeable membrane 5 prevents the ingress of foreign matter into the cavity holding the PCB 7, the excitation signal generator and the signal processor, without interfering with the electromagnetic coupling between the transmit aerial, the receive aerial and the resonant circuits 9.

FIG. 2 shows a circuit diagram of one of the resonant circuits 9. As shown, each resonant circuit 9 includes a coil 21 whose ends are connected together via a capacitor 23. As the coil 21 has an associated inductance, the resonant circuit 9 has an associated resonant frequency. In this embodiment, each of the resonant circuits 9 has a respective different resonant frequency between 1 MHz and 3 MHz.

As shown in FIG. 3, the ball 1 is formed by a spherical plastic body 31 in which three orthogonal circumferential grooves 33a, 33b and 33c, are formed. Each of the resonant circuits 9 is formed by ten turns of insulated copper wire 35a, 35b and 35c within a respective circumferential groove 33, with the ends of the wires soldered to respective terminals of a capacitor. The wound assembly is then potted and sealed by a covering coat 37 formed of polymer epoxy.

As shown in FIGS. 4A to 4E, the PCB 7 is generally square in shape with the fixed point 13, above which the centre 11 of the ball 1 is positioned by the point supports 3, substantially located at the centre of the PCB 7. In this embodiment, five windings are formed on the PCB 7, four of which form the transmit aerial and the remaining one of which forms the receive aerial. These five windings are illustrated in FIGS. 4A to 4E respectively.

The transmit aerial is formed by two pairs of excitation windings. FIGS. 4A and 4B show the first pair of excitation windings, hereafter called the X_sine coil 41 and the X_cosine coil 43 and FIGS. 4C and 4D show the second pair of excitation windings, hereafter called the Y_sine coil 51 and the Y_cosine coil 53.

As shown in FIG. 4A, the X_sine coil 41 is formed by a conductive track which generally extends around the periphery of the PCB 7 apart from a cross-over point halfway along the PCB 7 in the X-direction, at which the conductive track on each edge of the PCB 7 crosses to the corresponding opposing edge of the PCB 7. In this way, effectively a first current loop 45a and a second current loop 45b are formed. When a signal is applied to the X_sine coil 21, current flows around the first current loop 45a and the second current loop 45b in opposing directions, and a magnetic field is generated which passes through the Y-Z plane including the point 13 generally perpendicularly.

As shown in FIG. 4B, the X_cosine coil 43 is formed by a conductive track which generally extends around the periphery of the PCB 7 apart from two cross-over points, located one-quarter and three-quarters of the way along the PCB 7 in the X-direction respectively. In this way, three loops 47a, 47b and 47c are formed of which the outer loops 47a and 47c are approximately half the size of the inner loop 47b. When a signal is applied to the X_cosine coil 43, current flows in one direction around the outer loops 47a and 47c and in the opposite direction around the inner loop 47b. In this way, the magnetic field generated by the current flowing around the inner loop 47b has an opposite polarity to the magnetic field generated by the current flowing around the outer loops 47a and 47c, generating a magnetic field which passes generally perpendicularly through the X-Y plane including the point 13.

If $\theta_x$ is the angle subtended between the plane of a resonant circuit 9 and the X-direction, then the electromagnetic coupling between the X_sine coil 41 and the resonant circuit is proportional to $\sin\theta_x$ and the electromagnetic coupling between the X_cosine coil and the resonant circuit is proportional to $\cos\theta_x$.

As shown in FIGS. 4C and 4D, the Y_sine coil 51 and the Y_cosine coil 53 correspond to the X_sine coil 41 and X_cosine coil 43 rotated through 90° respectively. In this way, if $\theta_y$ is the angle subtended between the plane of the resonant circuit 9 and the Y-direction, then the electromagnetic coupling between the Y_sine coil 51 and the resonant circuit is proportional to $\sin\theta_y$ and the electromagnetic coupling between the Y_cosine coil 53 and the resonant circuit is proportional to $\cos\theta_y$.

As shown in FIG. 4E, the receive aerial is formed by a sensor winding 61 which extends around the periphery of the PCB 7. The layout of the transmit aerial and receive aerials is such that each excitation winding induces plural current components in the sensor winding 61 which cancel out so that substantially no sense current is generated by direct electromagnetic coupling between the transmit aerial and the receive aerial. Using such balanced excitation windings has the further advantage that emissions from the excitation windings diminish with distance at a faster rate than for a single planar winding. This allows larger drive signals to be used while still satisfying regulatory requirements for electromagnetic emissions.

In this embodiment, the orientation of each of the resonant circuits 9 is sequentially interrogated by applying excitation signals at the resonant frequency of the interrogated resonant circuit so that resonant signals are induced in the interrogated resonant circuit but not in the other resonant circuits. Further, during interrogation of a resonant circuit the angles $\theta_x$ and $\theta_y$ are sequentially determined by sequentially addressing the first and second pairs of excitation windings. From these measurements, rotational movement of the ball 1 around the x-axis and y-axis can be monitored.

An overview of the measurement of the angle $\theta_x$ will now be given with reference to FIG. 5. The excitation signal generator 71 generates an in-phase signal I(t) and a quadrature signal Q(t) at respective different outputs. The in-phase signal I(t) is generated by amplitude modulating an oscillating carrier signal having a carrier frequency $f_0$, which is substantially identical to the resonant frequency of the interrogated resonant circuit 9, using a first modulation signal which oscillates at a modulation frequency $f_1$, which in this embodiment is 3.9 kHz. The in-phase signal I(t) is therefore of the form:

$$I(t)=A \sin 2\pi f_1 t \cos 2\pi f_0 t \qquad (1)$$

Similarly, the quadrature signal Q(t) is generated by amplitude modulating the oscillating carrier signal having carrier frequency $f_0$ using a second modulation signal which oscillates at the modulation frequency $f_1$, with the second modulation signal being $\pi/2$ radians (90°) out of phase with the first modulation signal. The quadrature signal Q(t) is therefore of the form:

$$Q(t)=A \cos 2\pi f_1 t \cos 2\pi f_0 t \qquad (2)$$

The in-phase signal I(t) is applied to the X_sine coil 41 and the quadrature signal Q(t) is applied to the X_cosine coil 43.

The total magnetic field generated has components corresponding to the X_sine coil 41 and the X_cosine coil 43. The electromagnetic coupling $C_1$ between the component of the total magnetic field corresponding to the X_sine coil 41 and the interrogated resonant circuit 9 varies sinusoidally with $\theta_x$ according to the function:

$$C_1 \propto \sin\theta_x \qquad (3)$$

Similarly, the electromagnetic coupling $C_2$ between the component of the total magnetic field corresponding to the X_cosine coil 43 and the interrogated resonant circuit 9 also varies sinusoidally with $\theta_x$, but with a phase difference of $\pi/2$ radians (90°) from the electromagnetic coupling $C_1$, giving:

$$C_2 \propto \cos\theta_x \qquad (4)$$

In this way, the resonant current $I_{res}$ induced in the interrogated resonant circuit is formed by a first component from the X_sine coil 41 and a second component from the X_cosine coil 43, with the magnitudes of the first and second components varying with the angle $\theta_x$. In particular, the induced resonant current $I_{res}$ is of the form:

$$I_{res} \propto \cos 2\pi f_0 t . \cos(2\pi f_1 t - \theta_x - \theta_c) \qquad (5)$$

where $\theta_c$ is a fixed phase shift. In effect, the phase of the amplitude envelope function of the induced resonant current $I_{res}$ rotates along with the angle $\theta_x$.

Provided that the plane of the interrogated resonant circuit 9 is not orthogonal to the plane of the PCB 7, the induced resonant current $I_{res}$ induces a proportional sense current in the sense coil 61 which is input to the signal processor, which in this embodiment is formed by a demodulator 73, a phase detector 75 and an angle calculator 77. The demodulator 73 removes the component of the sense current at frequency $f_0$, leaving a demodulated signal at the frequency $f_1$. The demodulated signal is input to the phase detector 75, which measures the phase of the demodulated signal relative to a reference phase, and outputs the measured phase to the angle calculator 77 which determines the angle $\theta_x$.

The excitation signal generator and the signal processor used in this embodiment are described in more detail in UK Patent Application GB 2374424A, whose contents are incorporated herein by reference.

Once the angle $\theta_x$ has been measured for an interrogated resonant circuit 9, the angle $\theta_y$ is measured by switching the outputs I(t) and Q(t) of the excitation signal generator 71 from the X_sine coil 41 and X_cosine coil 43 to the Y_sine coil 51 and Y_cosine coil 53 respectively. After both the angles $\theta_x$ and $\theta_y$ have been measured for a resonant circuit 9, then the interrogated resonant circuit is changed by switching the frequency $f_0$ to match the resonant frequency of one of the other resonant circuits.

SECOND EMBODIMENT

In the first embodiment, a ball tracking device is described in which rotational movement of a ball by a user is monitored by a machine. Such a ball tracking device is commonly used in conjunction with a display to control the movement of a cursor over the display. In such a system, once the cursor has been positioned over a desired portion of the display surface (for example over an icon associated with a computer program), typically the user activates a switch to indicate a selection.

A second embodiment will now be described with reference to FIG. 6 in which a switching device is incorporated within the ball tracking device. In FIG. 6, components which are identical to corresponding components of the first embodiment have been referenced with the same numerals and will not be described in detail again.

As shown in FIG. 6, a switch 81 is mounted on the PCB 7 and protrudes into one of the point supports 3. In this embodiment, the switch 81 is a normally-open spring loaded switch and the point support 3c is made of a resilient material which, when a user presses down hard (i.e. more firmly than when varying the orientation of the ball 1), deforms so that the contacts of the switch 81 close indicating a user selection.

THIRD EMBODIMENT

The first and second embodiments describe ball tracking devices in which a user directly manipulates the ball 1.

A third embodiment of the invention will now be described with reference to FIG. 7 in which the ball tracking device is incorporated within a computer mouse. In FIG. 7, components which are identical to corresponding components of the first embodiment have been referenced with the same numerals and will not be described in detail again.

As shown in FIG. 7, the ball 1 is mounted within a housing 91 along with the PCB 7. A portion of the ball 1 protrudes out of the housing 91, and in common usage this protruding portion of the ball 1 rests on a surface 93 so that when a user holding the housing 91 drags the computer mouse over the surface 93, the ball 1 rotates. The rotational movement of the ball 1 is sensed using the transmit aerial and receive aerial on the PCB 7 in the same manner as in the first embodiment.

Although not shown in FIG. 1, the PCB 7 is isolated from the ball 1, and therefore the exterior of the housing 91, by an impermeable membrane. In this embodiment, the excitation generator and the signal processor are located in a host device which is connected to the computer mouse by a cable (not shown in FIG. 7).

FOURTH EMBODIMENT

As shown in FIG. 8, the ball tracking device of the present invention can also be incorporated within a joystick. Components in FIG. 8 which are identical to corresponding components in the first embodiment have been referenced with the same numerals and will not be described in detail again.

In this embodiment, the ball 1 is physically connected to a lever 101 (i.e. the joystick) which is manipulated by a user. The ball 1 is rotatably mounted within a housing 103 to form a ball-and-socket joint, and the PCB 7 is fixed relative to the housing 103. In this way, as the user moves the joystick the orientation of the ball 1 varies and this change in orientation is detected using the transmit aerial and the receive aerial formed on the PCB 7 in the same manner as the first embodiment.

FIFTH EMBODIMENT

In the fourth embodiment, in which the ball tracking device is incorporated within a joystick arrangement, the ball 1 is not required to have complete freedom of rotation because the lever 101 moves only within a restricted solid angle. This allows a single resonant circuit 9 to be used because it can be ensured that the orientation of this resonant circuit does not become orthogonal to the plane of the PCB 7.

A fifth embodiment of the invention will now be described with reference to FIG. 9 in which a single resonant circuit is formed on a piece of printed circuit board which moves with the ball 1. In FIG. 9, components which are identical to corresponding components in the fourth embodiment have been referenced with the same numerals and will not be described in detail again.

As shown in FIG. 9, in this embodiment a lever 111 passes through the centre of a ball 113 which is rotatably mounted within the housing 103. One end 115a of the lever projects outwardly of the housing 103 so that a user is able to manipulate the lever 111. The other end 115b of the lever 111 projects a short distance out of the ball 113, and a printed circuit board (PCB) 117 is fixed to this end 115b with the plane of the PCB 117 approximately parallel with the plane of the PCB 7 when the lever 111 is generally perpendicular to the plane of the PCB 7. A single resonant circuit (not shown in FIG. 9) is formed on the PCB 117. It will be appreciated that as the ball 113 rotates, the position of the resonant circuit on the PCB 117 above the transmit aerial and the receive aerial formed on the PCB 7 will vary, and this position is measured using equivalent processing to that used in the previous embodiments.

SIXTH EMBODIMENT

A sixth embodiment of the invention will now be described with reference to FIG. 10 in which a switch is added to the joystick arrangement of the fifth embodiment. Components of the sixth embodiment identical to corresponding components of the fifth embodiment have been referenced with the same numerals and will not be described in detail again.

In this embodiment, a normally open spring-loaded switch 121 is mounted to the end 115a of the lever 111 projecting out of the housing 103. The switch 121 is connected by wiring 123 through the lever 111 to the printed circuit board 117. In this embodiment, two resonant circuits are formed on the PCB 117. The first of the two resonant circuits is identical to that of the fifth embodiment and is used to determine the orientation of the ball 113. The second resonant circuit includes the switch 121 so that normally the second resonant circuit is open and does not resonate. However, when the user presses the switch 121, this second resonant circuit closes and resonates in response to an electric signal at its resonant frequency being applied to the transmit aerial on the PCB 7. In this way, by periodically applying an electric signal at the resonant frequency of the second resonant circuit, whether or not the switch 121 has been depressed can be continuously monitored.

MODIFICATIONS AND FURTHER EMBODIMENTS

The joysticks of the fourth to sixth embodiments can also incorporate biasing means for biasing the lever 111 to a centre position in which the lever 111 is perpendicular to the PCB 7. For example, magnets could be used to provide magnetic centring of these joystick arrangements.

In the fifth and sixth embodiments, the orientation of the ball within the joystick is determined using a resonant circuit which is mounted on a printed circuit board mounted to the outside of the ball. It will be appreciated that the resonant circuit could be formed by a conductive track deposited on another type of planar substrate. Further, the resonant circuit could be formed by forming a coil, connected at each end to a terminal of a capacitor, deposited directly on the surface of the spherical body.

In an alternative embodiment, resonant circuits incorporating small planar coils (i.e. having a radius significantly smaller than the radius of the spherical body) are spaced around the surface area of the spherical body. By monitoring the respective positions of these resonant circuits relative to the transmit aerial and the receive aerial, the orientation of the spherical body can be determined. Alternatively, these resonant circuits could be embedded under the surface of the spherical body.

In the illustrated embodiments, the resonant circuits mounted in or on the spherical body are passive resonant circuits. Alternatively, active resonant circuits, incorporating an amplifier for amplifying the resonant signals, could be used. Such active resonators would, however, require the spherical body to include a power source.

In the second and sixth embodiments, a user depresses a switch in order to make a selection. Alternatively, if as in the first embodiment there is a measure of resilience to the mounting for the spherical body, then a user may make a selection by pushing the spherical body closer to the transmit and receive aerials, which results in a larger signal being induced in the receive aerial.

In the sixth embodiment, the switch opens and closes a resonant circuit which is separate from the resonant circuit which is used for determining the orientation of the ball. Alternatively, a single resonant circuit could be used in which the ends of a coil are connected to respective terminals of a first capacitor, and a serial combination of a switch and a second capacitor are connected in parallel with the first capacitor. In this way, when the switch is open the resonant circuit has a first resonant frequency, whereas when the switch is closed the resonant circuit has a second resonant frequency different from the first resonant frequency. Therefore, by applying electrical signals substantially at the first and second resonant frequencies to the transmit aerial, the orientation of the ball can be monitored and whether or not the switch is open or closed can be determined.

In another embodiment, the switch may be replaced by a movable piece of permeable material (e.g. ferrite) placed in proximity to at least part of the winding forming the resonant circuit. Movement of the permeable material by the user causes a change in the resonant characteristics, for example resonant frequency or quality factor, which can be measured. Therefore, a user is able to make a selection by moving the permeable material.

In the described embodiments, lateral movement of the spherical body is prevented by a physical mounting means. However, in some embodiments this is not necessary. For example, the spherical body could be supported by jets of air. In the first embodiment, point supports are used to support the ball. It will be appreciated that other types of mounting means are possible. For example, roller bearings could be used to support the ball.

In the described embodiments, four excitation windings and one sensor winding are employed, with the excitation windings being addressed one pair at a time. Those skilled in the art will appreciate that a reciprocal arrangement is also possible in which an excitation signal is applied to a single excitation winding, and induced signals in plural sensor windings are monitored to determine the orientation of the ball. In general, many variations in the numbers of resonant circuits, excitation windings and sensor windings are possible.

In a preferred embodiment, the ball is removably mounted so that it can be used by a user as part of an access control system. In particular, the respective resonant frequencies of the resonant circuits within the balls are varied from ball to ball so that each user has a ball with unique resonant properties. The man-machine interface device performs an initialisation routine in which excitation signals at all possible resonant frequencies are applied to the transmit aerial, and from the signals received by the receive aerial the resonant frequencies of the ball currently being used are determined. In this way, the man-machine interface device is able to identify the user.

In the described embodiments, the spherical body forms part of a man-machine interface in which a user varies the orientation of the spherical body to input information to a machine. However, the invention is generally applicable to any device in which the orientation and/or movement of a spherical body conveys information. For example, in an aircraft an attitude sensor frequently employs a ball, weighted at one pole, supported by a fluid so that as the attitude of the aircraft varies the ball remains in a fixed position with respect to ground. Therefore, by mounting the transmit aerial and the receive aerial so that they move with the aircraft, the attitude of the aircraft can be detected by measuring the relative orientation between the ball and the transmit and receive aerials.

The invention claimed is:

1. An apparatus for monitoring orientation of a substantially spherical body, the apparatus comprising:
    a substantially spherical body;
    at least one resonant circuit fixed relative to the spherical body;
    a physical mounting for fixing a location of the spherical body relative to the apparatus while allowing rotational movement of the spherical body;
    a transmit aerial for generating an alternating magnetic field in the location of the spherical body to induce an electric signal in each resonant circuit, the transmit aerial comprising a plurality of excitation windings that are arranged so that the magnetic field generated from each winding is generally spatially orthogonal to the fields from each of the other windings; and a receive aerial for receiving an induced sense signal generated in response to the induced electric signal in each resonant circuit, the receive aerial comprising a sensor winding;

wherein an electromagnetic coupling between one or both of i) the transmit aerial and each resonant circuit and ii) each resonant circuit and the receive aerial, varies in accordance with the orientation of the spherical body so that the induced sense signal in the receive aerial varies in accordance with the orientation of the spherical body; and wherein the excitation windings are operable to induce minimal net voltage components in the sensor winding generated by direct electromagnetic coupling between the transmit aerial and the receive aerial.

2. An apparatus according to claim 1, wherein the spherical body has a plurality of resonant circuits.

3. An apparatus according to claim 2, wherein each of the plurality of resonant circuits has a respective different resonant frequency.

4. An apparatus according to claim 1, wherein each resonant circuit is mounted within the spherical body.

5. An apparatus according to claim 1, wherein each resonant circuit is mounted outside of the spherical body.

6. An apparatus according to claim 5, wherein each resonant circuit comprises a conductive track formed on a planar substrate.

7. An apparatus according to claim 6, wherein the planar substrate is a printed circuit board.

8. An apparatus according to claim 1, wherein each resonant circuit comprises a planar coil.

9. An apparatus according to claim 8, wherein each planar coil is centred at the centre of the spherical body.

10. An apparatus according to claim 9, comprising a plurality of planar coils having respective planes which are orthogonal to each other.

11. An apparatus according to claim 1, wherein each resonant circuit is a passive resonant circuit.

12. An apparatus according to claim 1, wherein the physical mounting is operable to mount detachably the spherical body.

13. An apparatus according to claim 1, wherein the excitation windings are formed on a planar substrate.

14. An apparatus according to claim 1 wherein the sensor winding is formed on a planar substrate.

15. An apparatus according to claim 13, wherein the planar substrate is a printed circuit board.

16. An apparatus according to claim 1 further comprising a signal generator operable to generate an excitation signal and arranged to apply the generated excitation signal to at least one excitation winding in order to generate an electric signal in the sensor winding.

17. An apparatus according to claim 1, further comprising a signal processor operable to process the signal induced in the sensor winding to determine a value representative of the orientation of the spherical body.

18. An apparatus according to claim 1, further comprising a membrane separating the transmit aerial and the receive aerial from the spherical body.

19. An apparatus according to claim 18, wherein the membrane is impermeable.

20. A man-machine interface device comprising an apparatus according to claim 1.

21. A man-machine interface device according to claim 20, further comprising a user-operable switch.

22. A man-machine interface device according to claim 21, wherein the switch is operable to vary the resonant characteristics of a resonant circuit mounted in or on the spherical body.

23. A tracker ball apparatus comprising an apparatus according to claim 1.

24. A computer mouse comprising an apparatus according to claim 1.

25. A joystick comprising an apparatus according to claim 1.

* * * * *